Figure 1:
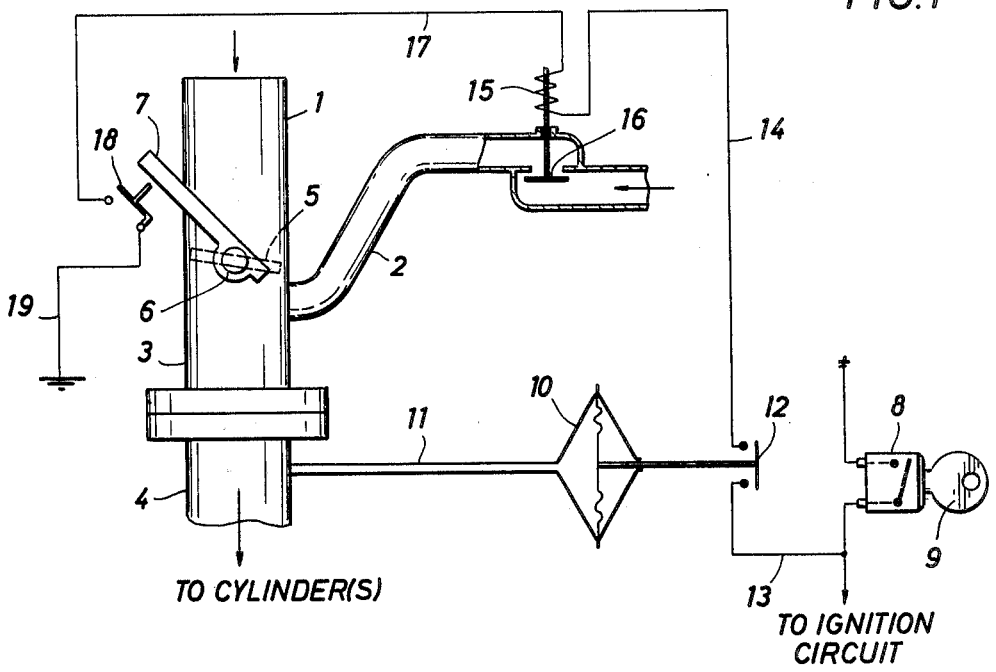
Figure 2:
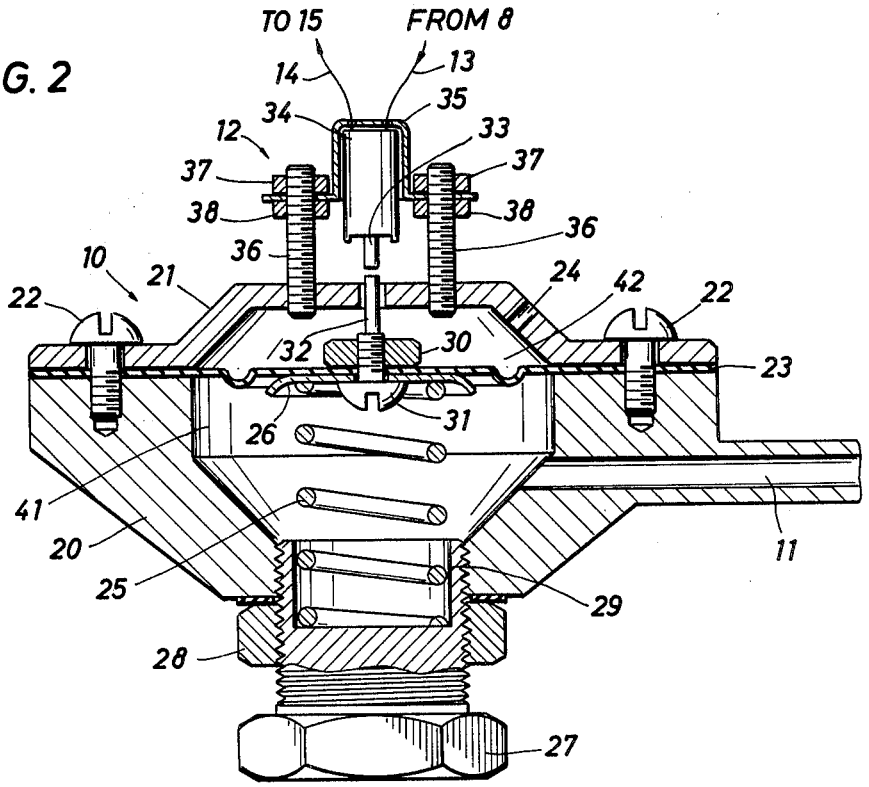
Figure 3:
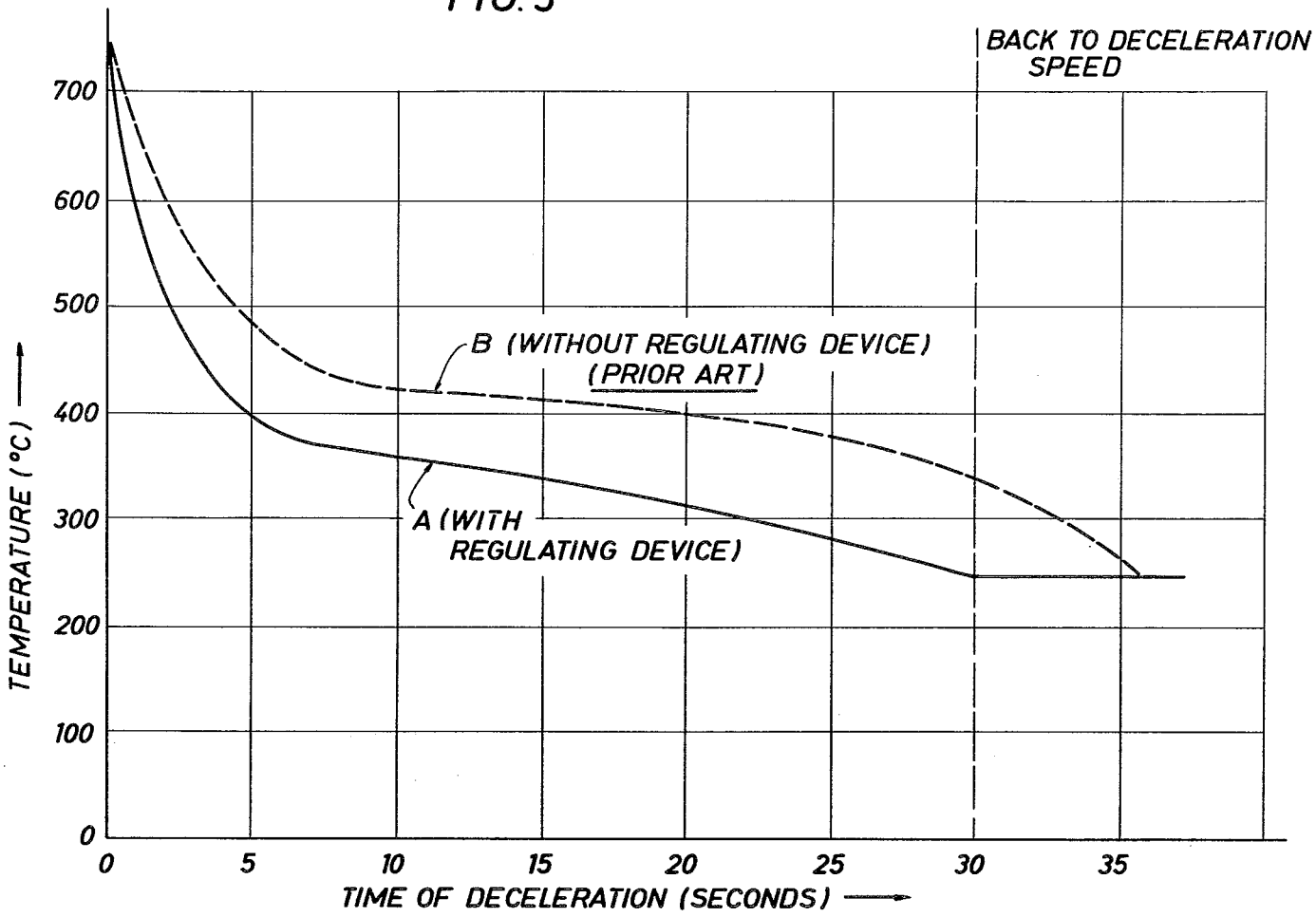
Figure 4:
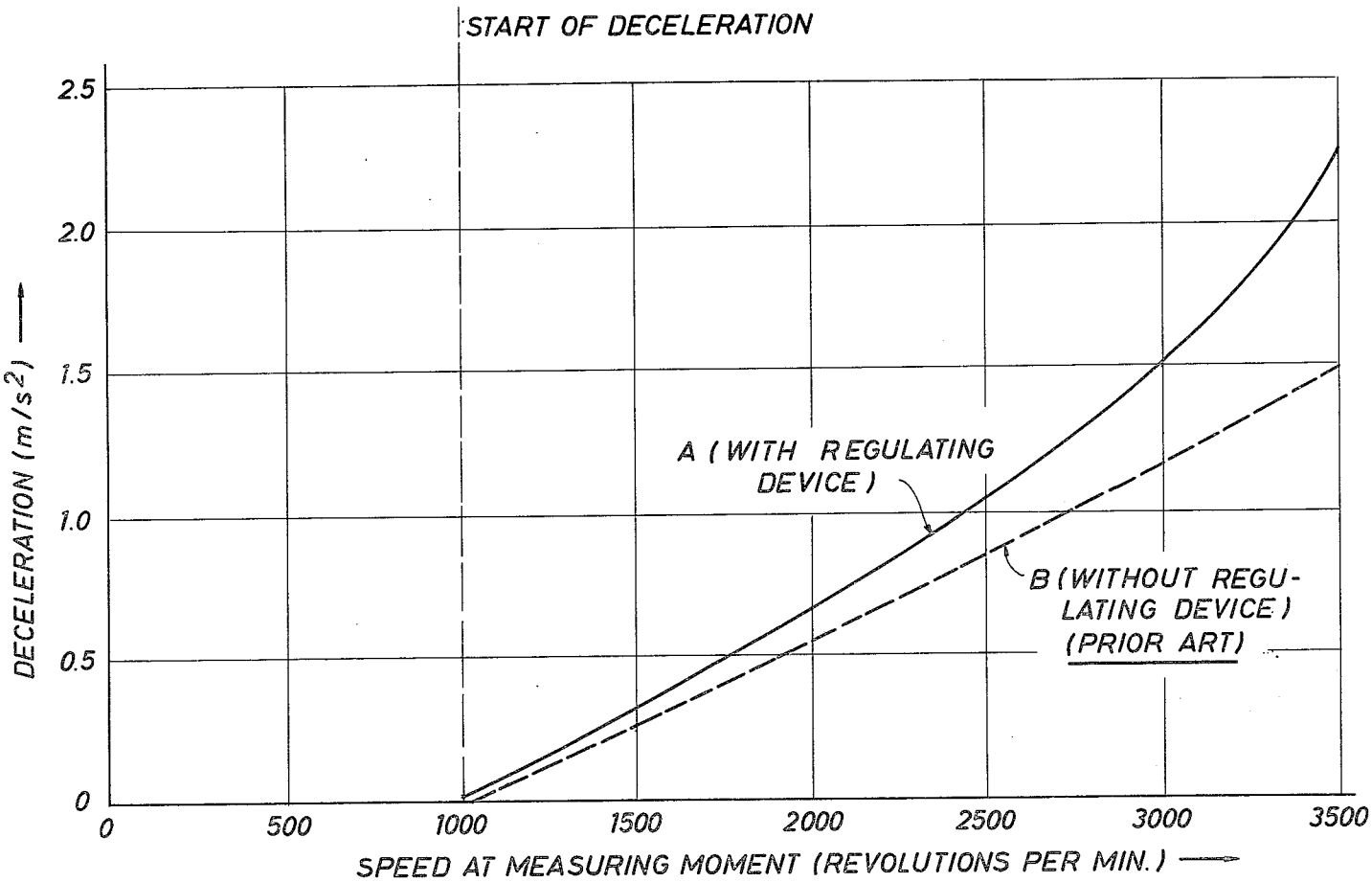

United States Defensive Publication [19] (H) [11] T986,009

Muller [43] Sep. 4, 1979

[54] FUEL FLOW REGULATOR FOR CARBURETORS

[75] Inventor: Patrick J. Muller, Saint-Etienne-du-Rouvray, France

[73] Assignee: Shell Oil Company

[21] Appl. No.: 963,251

[22] Filed: Nov. 24, 1978

[30] Foreign Application Priority Data

Jan. 12, 1978 [FR] France ..... 78 00809

[51] Int. Cl.[2] ..... F02M 3/04

[52] U.S. Cl. ..... 261/69 R; 48/180 C; 123/97 B; 261/DIG. 19; 261/DIG. 74

[57] ABSTRACT

Improved fuel consumption rates are achieved by utilizing a novel flow regulator on a standard carburetor used in an internal combustion controlled ignition engine. The flow regulator comprises a pressure detector connected to the fuel-air mixing chamber of the carburetor, said detector being capable of detecting an absolute pressure lower than a pre-determined limit. A control link between the pressure detector and the fuel inlet valve to the mixing chamber is provided, which link is able to close the valve when it is detected that the absolute pressure in the mixing chamber falls below the predetermined limit, such as when the engine is decelerating. In the case of a gaseous fuel carburetor, the fuel inlet valve may be located in the main gas inlet line, whereas in the case of a liquid fuel carburetor, the fuel inlet valve may be located in the idle fuel line.

7 Claims, 3 Sheets Drawing,

10 Pages Specification

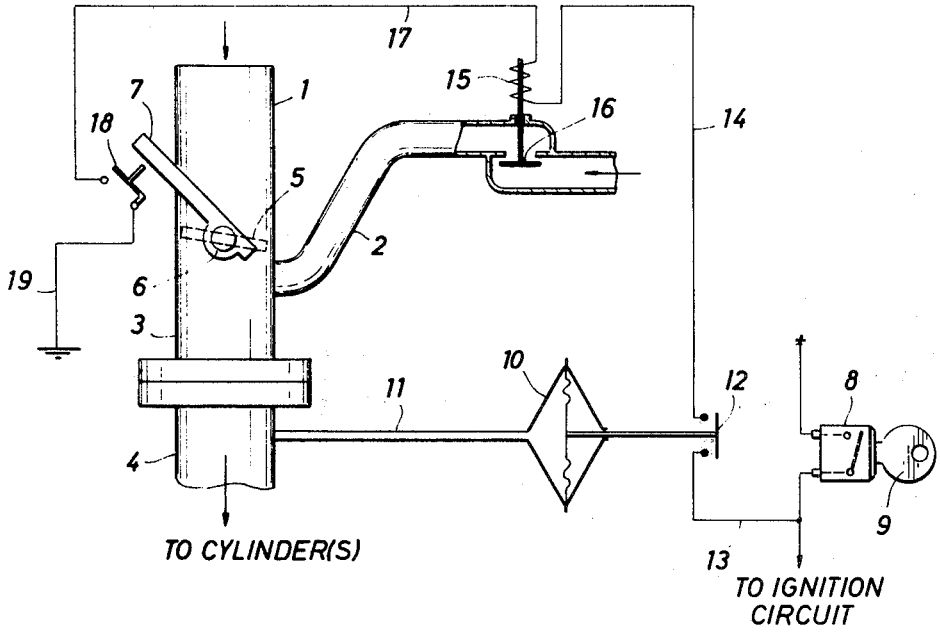

The file of this unexamined application may be inspected and copies thereof may be purchased (849 O.G. 1221, Apr. 9, 1968).